Jan. 15, 1924.
LE ROY O. EDWARDS
1,480,707
FISH LURE
Filed Aug. 7, 1922
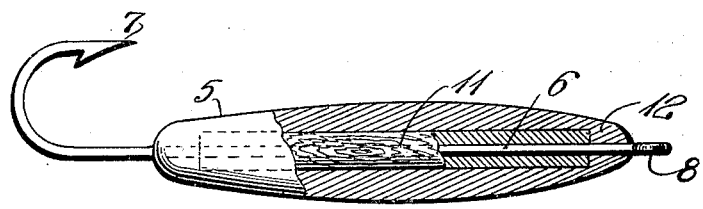
LeRoy O. Edwards  INVENTOR.
BY
Norman J. Whitaker  ATTORNEY Patented Jan. 15, 1924.

1,480,707

UNITED STATES PATENT OFFICE.

LE ROY OSBORN EDWARDS, OF EAST HAMPTON, NEW YORK.

FISH LURE.

Application filed August 7, 1922. Serial No. 580,331.

*To all whom it may concern:*

Be it known that I, LE ROY O. EDWARDS, a citizen of the United States, and a resident of East Hampton, county of Suffolk, and the State of New York, have invented a new and useful Improvement in Fish Lures, of which the following is a specification.

My invention relates to fish lures and its principal object is to provide a device of this character which is inexpensive and durable.

Further the invention provides a light and durable device which will not be deteriorated by the action of the water.

Another object of the invention is to provide a fish lure which carries a fish-hook arranged in a manner to readily engage a fish attempting to catch the lure.

With the preceding and other objects and advantages that become apparent from the following disclosure the invention consists in the novel, combination of elements, constructions, arrangements of parts and operations to be hereinafter described, claimed and illustrated in the accompanying drawing, wherein:

The figure is a view partly in section of a fish lure.

Referring in detail to the drawing, the numeral 5 refers to a fish lure having a body formed of aluminum or other bright metal through which a shank 6 extends longitudinally. At one end of the shank 6 there is a fish hook 7 and on the other end of the shank there is an eye 8. A wood core 11 is surrounded by a metallic casing 12. This casing 12 is made in the shape of a prolate spheroid or cigar-shaped, in order to permit the lure to pass through water with little resistance, also to balance the same.

The solid metal casing may be formed about the non-metallic core by being molded or any other approved manner, well known to those skilled in the art.

It is to be understood that the form of my invention herein shown and described is to be taken as a preferred example of the same, and that various changes in the shape, size and arrangement of parts may be resorted to without departing from the spirit of the invention or the scope of the subjoined claim.

Having thus described my invention what I claim as new and desire to secure and protect by Letters Patent of the United States is:

A fish lure comprising a non-metallic core, a solid metal casing of prolate spheroid shape surrounding said core and a shank passing through the core and casing, said shank having a fish hook on one end and an eye on the other end.

LE ROY OSBORN EDWARDS.